US010698588B2

(12) United States Patent
Price et al.

(10) Patent No.: US 10,698,588 B2
(45) Date of Patent: Jun. 30, 2020

(54) COMBINED SELECTION TOOL

(71) Applicant: Adobe Inc., San Jose, CA (US)

(72) Inventors: Brian L. Price, San Jose, CA (US);
Byungmoon Kim, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1110 days.

(21) Appl. No.: 14/469,910

(22) Filed: Aug. 27, 2014

(65) Prior Publication Data

US 2016/0062615 A1  Mar. 3, 2016

(51) Int. Cl.
*G06F 3/0484* (2013.01)
*G06F 3/0482* (2013.01)

(52) U.S. Cl.
CPC ........ *G06F 3/04845* (2013.01); *G06F 3/0482* (2013.01); *G06F 3/04842* (2013.01)

(58) Field of Classification Search
CPC .......................... G06F 3/04842; G06F 3/04845
See application file for complete search history.

(56) References Cited

U.S. PATENT DOCUMENTS

| | | | | |
|---|---|---|---|---|
| 7,683,889 B2* | 3/2010 | Rimas Ribikauskas | ..................... G06F 3/0414 | 178/18.01 |
| 8,286,102 B1* | 10/2012 | Wilensky | ............ G06F 3/04845 | 715/782 |
| 8,290,253 B1* | 10/2012 | Wang | ................... G06K 9/4652 | 382/162 |
| 2008/0030497 A1* | 2/2008 | Hu | .......................... G06K 9/342 | 345/419 |
| 2011/0246875 A1* | 10/2011 | Parker | ................. G06F 3/04845 | 715/702 |
| 2013/0329994 A1* | 12/2013 | Webb | ....................... G09G 5/02 | 382/167 |

OTHER PUBLICATIONS

Xu et al., Object Segmentation using graph cuts based active contours, Jan. 16, 2007, ScienceDirect, Computer Vision and Image Understanding 107, pp. 210-224.*

* cited by examiner

*Primary Examiner* — Jennifer N To
*Assistant Examiner* — Ashley M Fortino
(74) *Attorney, Agent, or Firm* — SBMC

(57) ABSTRACT

Combined selection tool techniques are described in which selection of portions within an image is enabled via a tool configured to selectively switch between a coarse selection mode and a refinement selection mode. In one or more implementations, an image is exposed for editing in a user interface and input is obtained to select portions of the image using the tool. The selection mode is automatically toggled between the coarse selection mode and refinement selection mode based on characteristics of the input, such as position and velocity of the input or gestures mapped to the input. Then, selection boundaries defining the selection of portions of the image are modified in accordance with the input. In one approach, the coarse selection mode corresponds to a graph cut mechanism and the refinement selection mode corresponds to a level set mechanism.

20 Claims, 8 Drawing Sheets

COMBINED SELECTION TOOL

BACKGROUND

Consumer image editing is on the rise due at least in part to wide availability of the mobile phones, tablets, and other portable devices that include cameras and are powerful enough to support image editing software. A variety of different editing operations may be applied to process an image. In connection with image editing operations, a user may make selections of objects and/or other portions of an image to which the editing operations are applied. Editing software may provide rudimentary tools for selection within images, for instance a selection box tool or lasso tool. It may be difficult, though, to make precise selections with such rudimentary tools and the selection process may be quite time consuming. Such tools may also be difficult to use on mobile phones, tablets, and other mobile platforms, which may result in user frustration.

SUMMARY

Combined selection tool techniques are described in which selection of portions within an image is enabled via a tool configured to selectively switch between a coarse selection mode and a refinement selection mode. In one or more implementations, an image is exposed for editing in a user interface and input is obtained for selection of portions of the image using the tool. The selection mode is automatically toggled between the coarse selection mode and a refinement selection mode based on characteristics of the input, such as position and velocity of the input or gestures mapped to the input. Then, selection boundaries defining the selection of portions of the image are modified in accordance with the input. In one approach, the coarse selection mode corresponds to a graph cut mechanism and the refinement selection mode corresponds to a level set mechanism.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Some traditional photo editing applications may provide rudimentary tools for selection within images, for instance a selection box tool or lasso tool. Users may find it difficult, though, to make precise selections with such rudimentary tools particularly when using mobile platforms, such as tablets and smartphones. Thus, selection using the traditional tools can be quite time consuming as well as inaccurate, which may result in user frustration.

Combined selection tool techniques are described in which selection of portions within an image is enabled via a tool configured to selectively switch between a coarse selection mode and a refinement selection mode. In one or more implementations, an image is exposed for editing in a user interface and input is obtained to select portions of the image using the tool. The selection mode is automatically toggled between the coarse selection mode and a refinement selection mode based on characteristics of the input, such as position and velocity of the input or gestures mapped to the input. Then, selection boundaries defining the selection of portions of the image are modified in accordance with the input. In one approach, the coarse selection mode corresponds to a graph cut mechanism and the refinement selection mode corresponds to a level set mechanism.

In the following discussion, an example environment is first described that may employ the techniques described herein. Example details and procedures are then described which may be performed in the example environment as well as in other environments. Consequently, example details and procedures are not limited to the example environment and the example environment is not limited to example details and procedures described herein.

Example Environment

Figure 1:
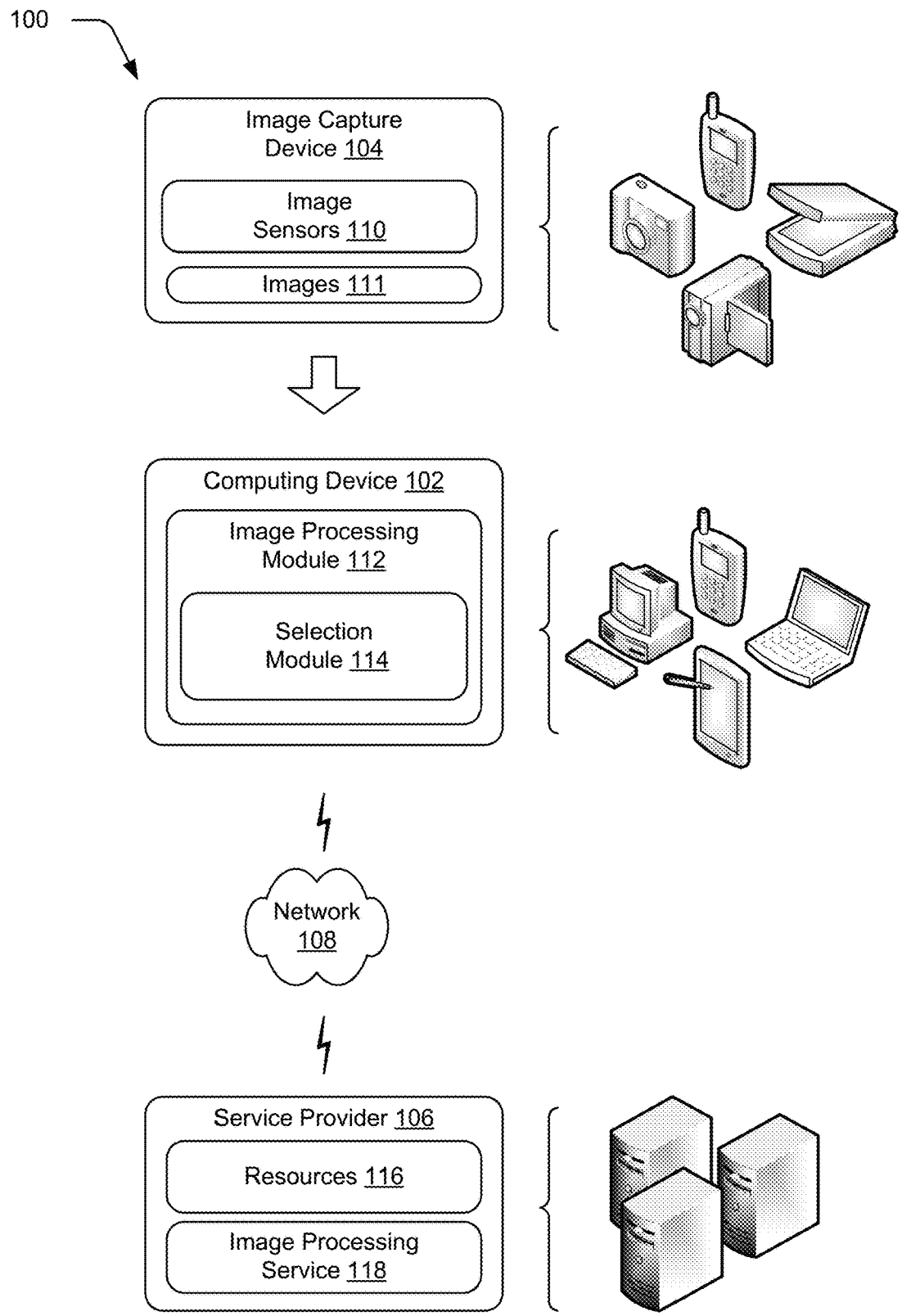
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102 may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 8 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 102. The image capture device 104 is illustrated as including image sensors 110 that are configured to form images 111. In general, the image capture device 102 may capture and provide images 111, via the image sensors 110, that may be stored on and further processed by the computing device 102 in various ways. Naturally, images 111 may be obtained in other ways also such as by downloading images from a website, accessing images from some form of computer readable media, and so forth.

The images 111 may be obtained by an image processing module 112. As before, although the image processing module 112 is illustrated as being implemented on a separate device it should be readily apparent that other implementations are also contemplated in which the image sensors 110 and image processing module 112 are implemented on the same device. Further, although illustrated as being provided by a computing device 102 in a desktop configuration, a variety of other configurations are also contemplated, such as remotely over a network 108 as service provided by a service provider, a web application, or other network accessible functionality.

Regardless of where implemented, the image processing module 112 is representative of functionality operable to manage images 111 in various ways. Functionality provided by the image processing module 112 to manage images may include but is not limited to functionality to organize, access, browse and view images, as well as to perform various kinds of image processing operations upon selected images. By way of example and not limitation, the image processing module 112 may include or otherwise make use of a selection module 114. The selection module 114 is representative of functionality to perform selections within images in connection with image editing operations. The selection may involve designating one or more selected portions or objects within the image as "selected". Image editing operations may then be applied to the "selected" portions and not to other, "non-selected" portions.

By way of example, the selection module 114 may be configured to enable selections via a combined selection tool as discussed herein. As mentioned, the combined selection tool may operate to selectively switch back and forth between selection modes to facilitate user selections of portions within images. The selection modes may include a coarse selection mode and a refinement selection mode details of which are discussed later in this document. The selection module 114 may change modes automatically based on characteristics of input provided to designated selected portions and without an explicit selection to toggle between modes. In one approach, mode selection may be based, at least in part, upon a positional relationship between the input and selection boundaries that define selected and non-selected portions. In addition or alternatively, gestures or input patterns may be associated with different selection modes and the mode selection may be based upon recognition of gestures or input patterns assigned to different modes.

Moreover, a variety of different algorithms and techniques to implement different selection modes are contemplated. In general, selection algorithms may rely upon pixels in areas surrounding selected pixels and locations of input to make distinctions between objects, boundaries, foreground/background, and so forth. This may involve examining content within the image in areas to which input is applied, sampling pixels from the surrounding areas, and automatically adding pixels to a "selected" group based upon the distinctions. By way of example and not limitation, a graph cut mechanism may be used to implement a coarse selection mode in combination with any suitable refined selection technique. A level set mechanism may be used to implement a refinement selection mode in combination with the graph cut mechanism, or other suitable coarse selection technique. Further details regarding the graph cut mechanism, the level set mechanism, and other aspects of a combined selection tool can be found in the following discussion.

As further shown in FIG. 1, the service provider 106 may be configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

For example, the service provider 106 in FIG. 1 is depicted as including an image processing service 118. The image processing service 118 represents network accessible functionality that may be made accessible to clients remotely over a network 108 to implement aspects of the techniques described herein. For example, functionality to manage and process images described herein in relation to image processing module 112 and selection module 114 may alternatively be implemented via the image processing service 118, or in combination with the image processing service 118. Thus, the image processing service 118 may be configured to provide cloud-based access to a combine selection tool as well as other tools and functionality described above and below.

Combined Selection Tool Details

Figure 2:
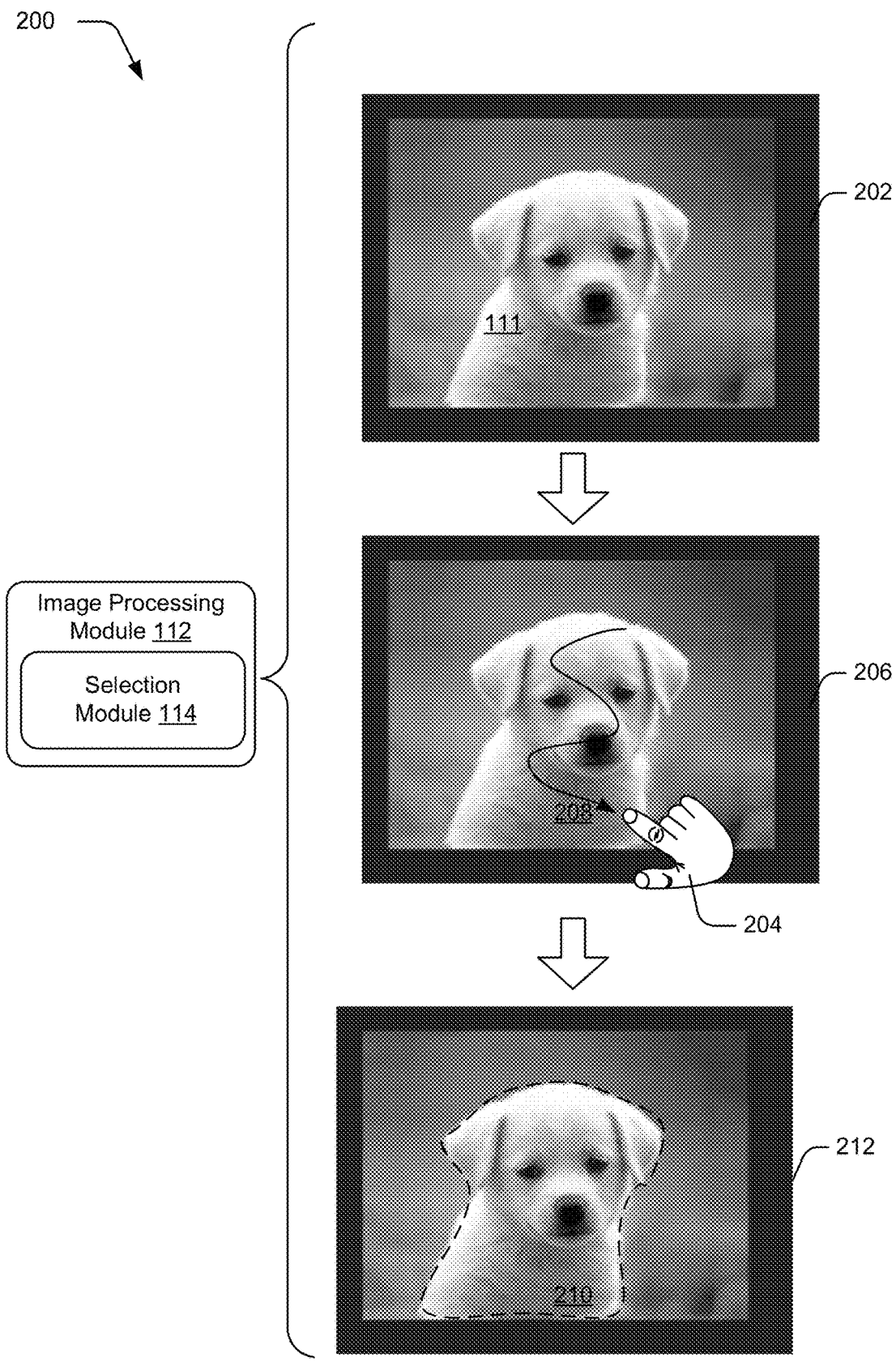
FIG. 2 depicts a system in an example implementation in which operation of an image processing module to perform selections for image editing operations is depicted.

FIG. 2 depicts a system 200 in an example implementation in which operation of the image processing module 112 and selection module 114 of FIG. 1 is represented in connection with one or more image editing operations. The system 200 is shown using different illustrative stages of making selections with an image 111 in connection with an image editing operation. The image may be obtained, directly from one or more image sensors 110, from storage upon some form of computer-readable media, by downloading from a web site, and so on.

As shown in FIG. 2, the image 111 may be exposed for editing within a user interface associated with the image processing module 112 as represented by stage 202. The user interface may provide functionality operable to perform various image editing operations upon the image. In an implementation, the user interface may be configured to support touch interaction in addition to or in lieu of input via a mouse, keyboard or other input device. Functionality for various image editing operations may be provided using one or more different types of user interface instrumentalities such as selectable icons, menu items, lists, key combinations, tool bars, interactive dialogs, or pop-up elements, to name some examples. The user interface may be further configured to support gestures and input patterns that may be mapped to corresponding actions and functionality, such as gestures that are associated with different selection modes discussed herein. Thus, a user may interact to view, edit, navigate, select, and otherwise manipulate an image or a library of images using functionality accessible via the user interface.

In the context of techniques described herein, the user interface may be configured to support a combined selection tool. For example, interaction 204 by a user as represented in stage 206 of FIG. 2 may be employed to make selections in the image 111. In this example, the input is represented in the form of swiping 208 back and forth across portions of the image to cause addition of the portions into a selected group. This swiping may result in positioning of selection boundaries 210 within the image as represented in stage 212. Effectively, a user may employ swiping strokes applied to the image as represented to add and remove content into a selected group. Different types of input are also contemplated, such as taping, dragging, enclosing portions within a circle, box, or other shape, and so forth.

The selection boundaries 210 may be determined automatically by the selection module 114 in response to the swiping or other input. The combined selection tool implemented by the selection module 114 enables toggling between at least coarse and refined selection modes, which may occur automatically based on characteristics of the input as described herein. Different types of input, input patterns, and/or gestures may be assigned to different selection modes supported by the selection module 114 and used as triggers for the different modes. Further details regarding selections using a combined selection tool are described in relation to the example scenarios of FIGS. 3 and 4 and the example procedures of FIGS. 5 to 7.

Figure 3:
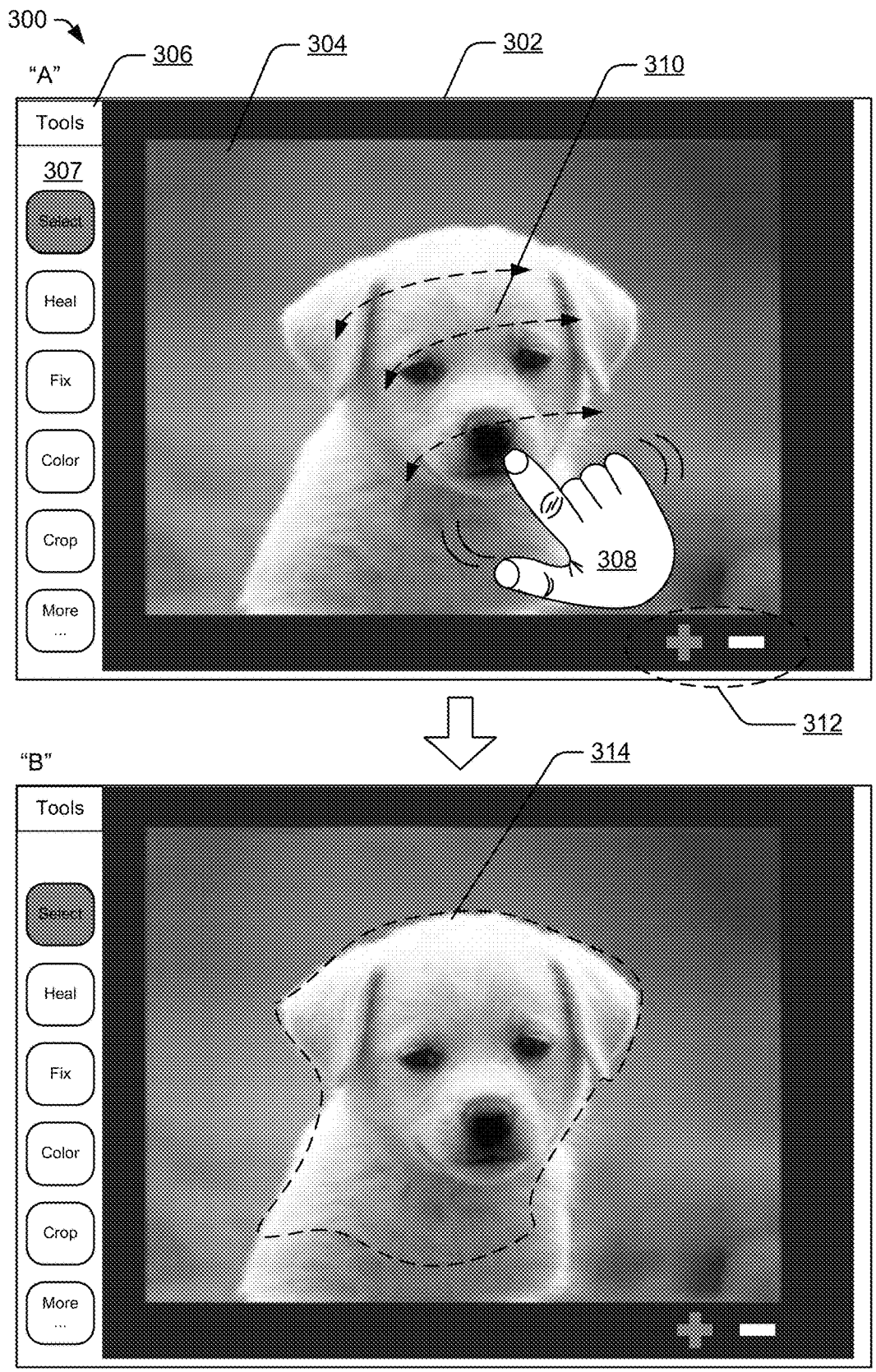
FIG. 3 illustrates details of a coarse selection mode in an example scenario in which a user interface having a combined selection tool is utilized for coarse selection in accordance with one or more implementations.

FIG. 3 depicts generally at 300 details of a coarse selection mode in an example scenario in which a user interface 302 having a combined selection tool is utilized for coarse selection in accordance with one or more implementations. The example user interface may be exposed via an image processing module 112 as previously mentioned. The user interface 302 may include an image display area 304 in which an image is presented. The presented image may be viewed and manipulated in various ways by a user using functionality provided by the image processing module 112. Various functionality may be accessible via a tools menu 306, which in this example is as a tool bar having selectable icons corresponding to various tools and image editing operations. Other configuration of a tools menu 306 are also contemplated such as a menu bar, a pop-up tool box, or other suitable configuration that facilitate selection from among various functionality provided by the image processing module 112. As represented in FIG. 3, the tools menu 306 may implement at least a selection tool 307 operable to perform various selection operations upon the image 304 as discussed herein.

FIG. 3 additionally represents an example scenario in which the selection tool 306 may be used to initiate selections by way of different views "A" and "B" of the user interface 302. In view "A", the selection tool 307 is illustrated as being activated on tools menu 306. Activation of a tool may be shown in various ways, one example of which is highlighting of the "select" icon as depicted in FIG. 3. With the selection tool activated, interaction 308 with the image may be employed to make selections or deselections of portions within the image. In this example, input in the form of back and forth strokes 310 or swiping is illustrated. The strokes may 310 be comparable to brushing across portions of the image to select or deselect the portions. The user interface 302 may also include a mechanism to switch between an add mode and remove mode for selection, such as the toggle control 312 illustrated in FIG. 3. Here, a plus icon may be used to select the add mode and a minus icon may be used to select the remove mode. The plus icon is shown as being highlighted to indicate that in the example scenario the add mode is activated.

Accordingly, as the strokes 310 are made across the image, selection boundaries may be defined and modified to correspond to the strokes. For example, selection boundaries 314 may be established based on the strokes as shown in view "B." Thus, in add mode, selection boundaries 314 may be expanded by input applied to portions of the images. Likewise, in remove mode, selection boundaries 314 may be contracted in response to input applied to the image. In a touch based input scenario, the selections and manipulation of selection boundaries 314 may occur via touch. Naturally, a stylus, mouse, keyboard or other input mechanism may also be employed.

Additionally, various visual cues and animations may be used to represent selection boundaries 314, changes in the boundaries, and indications of selected and non-selected portions. For example a border may be rendered at selection boundaries 314 as shown in FIG. 3. In addition or alternatively, highlighting, shading and/or color changes may be employed to show the portions that are selected as the strokes 310 are made across the image.

As mentioned, a coarse selection mode may be employed in which relatively large chunks of the image are selected in response to the input. Thus, with just a few swipes or strokes as represented in FIG. 3, the coarse selection mode may operate to make broad distinctions and select objects, such as by distinguishing elements associated with the dog in the foreground from elements in the background. The graph cut mechanism described above and below is one example of a mechanism that enables coarse selection.

The coarse selection mode may be associated with particular characteristics of the input, which may include position, direction, and/or velocity of the input and/or a particular gesture or input pattern that is associated with the coarse selection mode. Thus, the coarse selection mode may be automatically activated responsive to recognition of corresponding characteristics of the input. By way of example and not limitation, FIG. 3 represents triggering of the coarse selection mode based on recognition of input that is applied outside of the selection boundaries 314 in add mode. In this case, initial input applied before selection boundaries 314 are created (e.g., view "A") may be considered outside of the selection boundaries 314. On the other hand, in remove mode, input that is applied inside the selection boundaries 314 may be associated with the coarse selection mode and recognition of such input may trigger the coarse selection mode.

Figure 4:
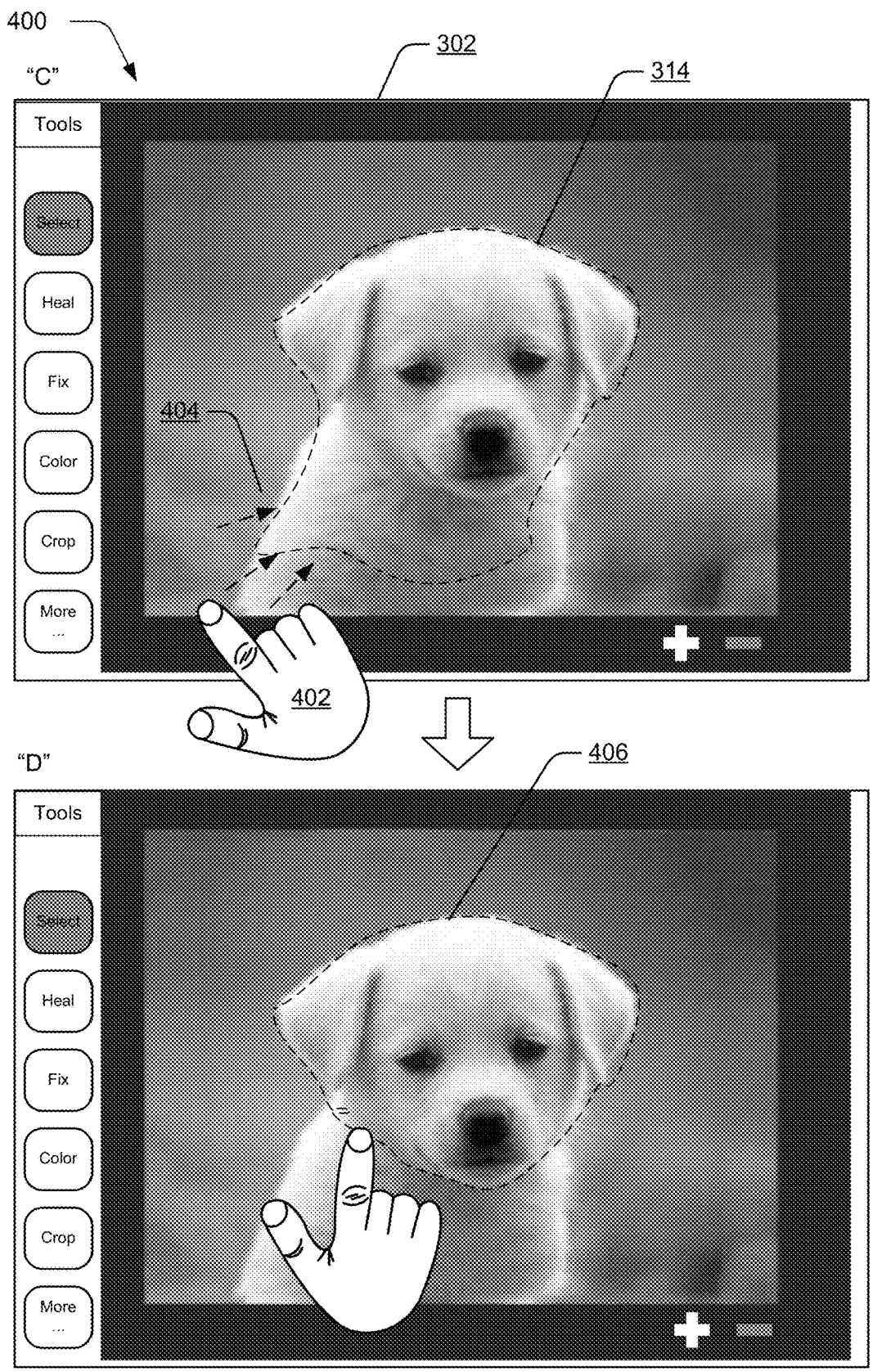
FIG. 4 illustrates details of a refinement selection mode in an example scenario in which a user interface having a combined selection tool is utilized for refined selection in accordance with one or more implementations.

FIG. 4 illustrates generally at 400 details of a refinement selection mode in an example scenario in which a user interface 302 having a combined selection tool is utilized for refined selection in accordance with one or more implementations. The details are discussed in relation to different views "C" and "D" of the user interface 302. As with the coarse selection mode, the refinement selection mode may be automatically activated responsive to recognition of corresponding characteristics of the input. In particular, the system may switch back and forth between the selection modes based at least in part upon the characteristics of the input.

Here, view "C" depicts interaction 402 with the image that may be employed to make selections or deselections of portions within the image using the refinement selection mode. In this example, input in the form of taps 404, short strokes, or other types of input is represented. The type of input associated with refinement selection mode (e.g., taps or short strokes) may be different than the type of input associated with coarse selection mode (e.g., swiping or long strokes). Alternatively, the choice of selection mode may be based on other characteristics, such as a positional relationship between the input and selection boundaries, in which case the same types of input may be associated with and employed for both coarse selection mode and refinement selection mode.

In the illustrated example, though, taps 404 are shown as being applied proximate to the selection boundaries 314 established in the example of FIG. 3. The taps enable relatively precise manipulation of the boundaries. Thus, tapping or other manipulation of the boundaries may activate refinement selection mode to make fine distinctions and select objects, such as by distinguishing elements based on color differences, shading, foreground and background borders, and so forth. The level set mechanism described above and below is one example of a mechanism that enables coarse selection.

In add mode, the taps 404 or other suitable input may be employed to bump the boundaries outward to encompass additional content. In add mode, the taps may be applied or originate inside of the boundaries, which triggers the refinement selection mode. In remove mode (as illustrated in FIG. 4), the taps 404 or other suitable input may be employed to bump the boundaries inward to remove content and/or precisely position the boundaries. In remove mode, the taps may be applied or originate outside of the boundaries, which triggers the refinement selection mode. Here, the taps 404 are used to refine the selection boundaries 314 and create modified boundaries 406, such as to precisely select the dog's face as shown in view "D".

The selection tool 307 is configured to combine the coarse selection mode and refinement selection and automatically switch back and forth between these modes. The selection tool 307 operates to identify an appropriate mode and activate the modes without a user having to explicitly switch from mode to mode. In the context of the examples in FIGS. 3 and 4, the dog's head and neck may be quickly selected with just a few swipes using coarse selection mode as in FIG. 3. A user may then refine the selection to focus on the dog's face using taps as in FIG. 4, which automatically causes a switch to refinement selection mode based on the characteristics of the input. In this way, a combined selection tool may be provided and employed to seamlessly toggle back and forth between selection modes, which enable users to make relatively quick and precise selections within images. Additional aspects of a combined selection tool are discussed in relation to the following example procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example of FIGS. 1-4.

Figure 5:
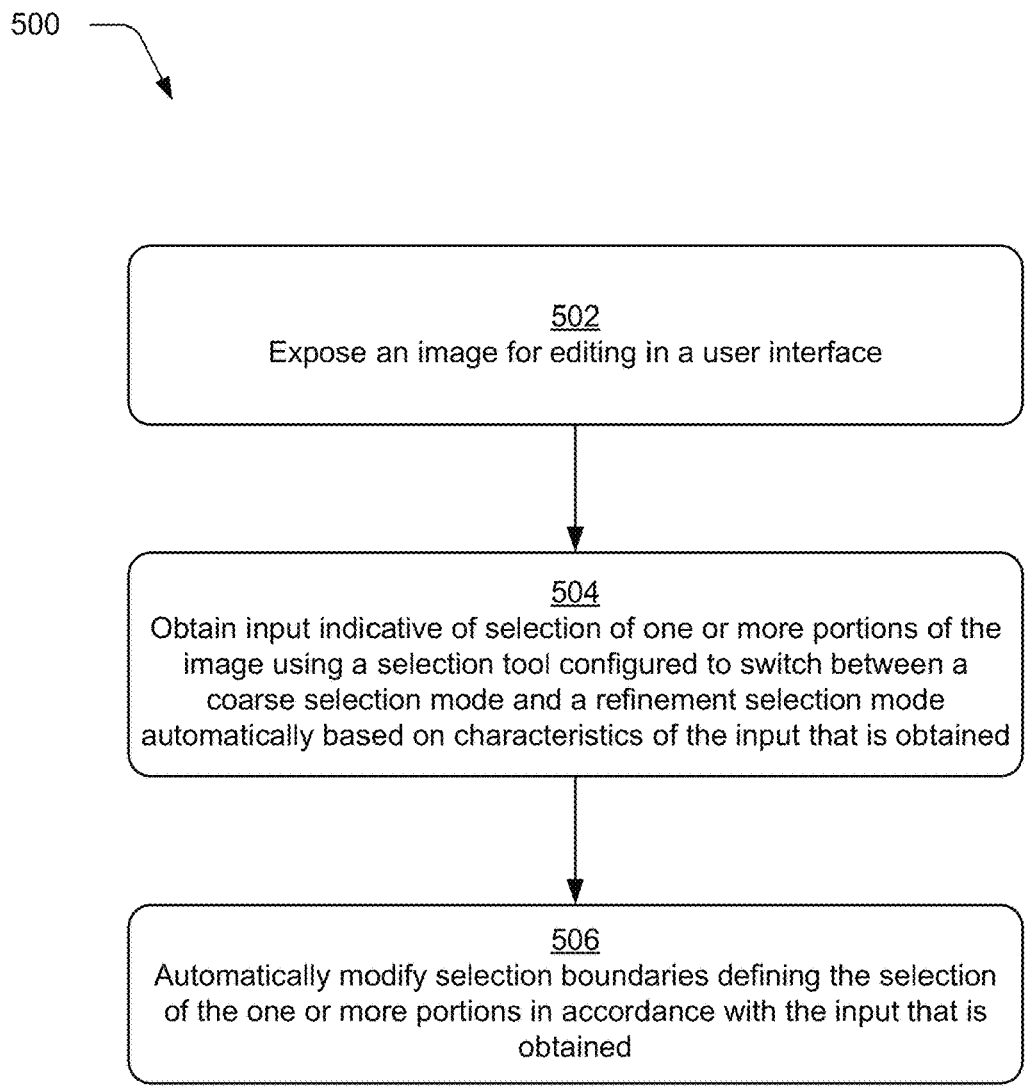
FIG. 5 is a flow diagram depicting a procedure in an example implementation of a combined selection tool.

FIG. 5 is a flow diagram depicting a procedure 500 in an example implementation of a combined selection tool. An image for exposed editing in a user interface (block 502). For example, an image processing module 112 may be invoked to view and process images as discussed herein. The image processing module 112 may support selections via a selection module 114 as well as other functionality for managing and performing image editing operations upon images. A selected image may be exposed for editing via a user interface provided by or otherwise associated with the image processing module 112.

Input is obtained that is indicative of selection of one or more portions of the image using a selection tool configured to switch between a coarse selection mode and a refinement selection mode automatically based on characteristics of the input that is obtained (block 504). Various kinds of input may be used to make selections, some examples of which were discussed previously. Input may be touch based input, input from a device (mouse, keyboard, stylus, etc.), and so forth. The selection module 114 may support various selection modes including at least modes for coarse and refined selection. Further, the selection module 114 may be configured to enable switching between an add mode and a remove mode to facilitate selection and deselection, respectively, of objects, pixels, elements or other portions of an image.

Various characteristics are contemplated that may be used as basis for ascertaining and switching between different selection modes. Generally speaking, the characteristics may include one or more of a direction, velocity, a position, an input pattern (e.g., a defined sequence of multiple inputs), or a gesture associated with the input. In one example, the characteristics of the input include a positional relationship between the input and the selection boundaries. The positional relationship may indicate whether the input is applied or originates inside or outside the selection boundaries as discussed above and below. Thus, establishing the selection mode may involve determining whether the input is applied inside or outside relative to the selection boundaries. In addition or alternatively, the coarse selection mode and the refinement selection mode may be associated with respective gestures recognizable based on the input. In this case, establishing the selection mode may involve recognition of a gesture indicated by the input and setting the selection mode to correspond to the gesture that is recognized. For example, long swipes may be associated with coarse selection mode whereas taps and/or shorter swipes may be associated with refinement selection mode. A variety of other kinds of gestures are also contemplated.

Then, selection boundaries defining selection of the one or more portions are automatically modified in accordance with the input that is obtained (block 506). The selection boundaries define selected and non-selected portions of the image. Operations may be applied to selected portions. For instance, the user interface may corresponds to an image editing application configured to provide multiple tools for editing images. However, the combined selection tool may be employed in other scenarios also, including but not limited to other types of applications (e.g., a paint program or video production application).

Figure 6:
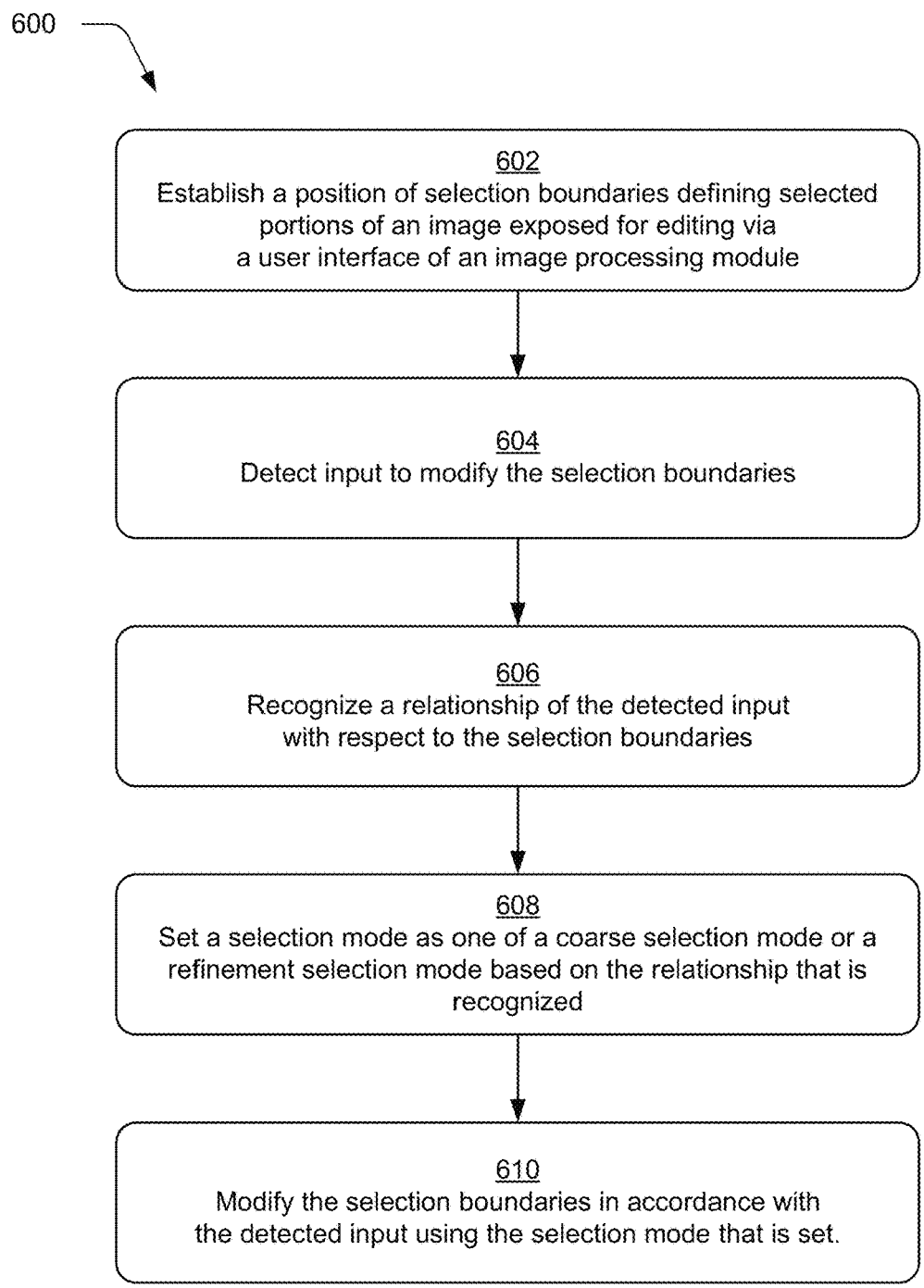
FIG. 6 is a flow diagram depicting a procedure in an example implementation in which selection boundaries are modified.

FIG. 6 is a flow diagram depicting a procedure 600 in an example implementation in which selection boundaries are modified. A position is established of selection boundaries defining selected portions of an image exposed for editing via a user interface of the image processing module (block 602). Selection boundaries may be established using the techniques and selection modes described herein. Then, input to modify the selection boundaries is detected (block 604). Here, the input is applied to modify existing selection boundaries. The input may be provided to add or remove content to the selected group. The selection mode that is used for the modification may be dependent upon various characteristics as noted previously.

In one approach to mode selection, a relationship of the detected input with respect to the selection boundaries is recognized (block 606). Then, a selection mode is set as one of a coarse selection mode or a refinement selection mode based on the relationship that is recognized (block 608). The relationship may be a positional relationship, a detailed example of which is depicted and discussed in relation to the example procedure of FIG. 7 below. Other relationships are also contemplated, such as direction of the input in relation to the boundaries, distance from the boundaries, velocity and so forth. In another example, the relationship may be defined in terms of gestures relative to the boundaries, such as inward/outward swipes, taps on the boundaries, press and flick motions, or other gestures that may be associated with different selection modes. In any event, an appropriate mode that matches the detected input may be identified based on the input and then set as the active mode for modification. Setting the selection mode may additionally involve determining whether an add mode or remove is activated. Accordingly, the selection mode may be set in dependence upon the input relationship that is recognized as wells as whether the add or remove mode is currently activated.

By way of example, recognizing the relationship may include determining whether the detected input is applied inside or outside of the selection boundaries. In one particular example, when the add mode is activated, the coarse selection mode is used when the input is applied outside relative to the selection boundaries and the refinement selection mode is used when the input is applied inside relative to the selection boundaries. On the other hand, when the remove mode is activated, the coarse selection mode is used when the input is applied inside relative to the selection boundaries and the refinement selection mode is used when the input is applied outside relative to the selection boundaries.

However, mode selection may also be based on gestures that are defined and associated with respective modes, in which case the positional relationship determination may be omitted. Different gestures may be associated with each selection mode that is supported as well as with addition and removal from the selection. As such an explicit selection of the add mode or remove mode may also be omitted when sufficient gestures are defined for add and remove scenarios. Naturally, a combination of gestures that are mapped to selection modes and an explicit selection of the add mode or remove mode may also be employed. Accordingly, recognition of the relationship may be based upon recognizing a gesture associated with the input. The selection mode may then be set by ascertaining one of the coarse selection mode or the refinement selection mode as matching the recognized gesture and activating the matching modes as the selection mode.

Thereafter, the selection boundaries are modified in accordance with the detected input using the selection mode that is set (610). For example, swipes may be used to add or remove content from the selection with coarse selection techniques or taps may be used to refine the boundaries in dependence upon the input relationship that is recognized and/or whether an add mode or a remove mode is currently activated.

Figure 7:
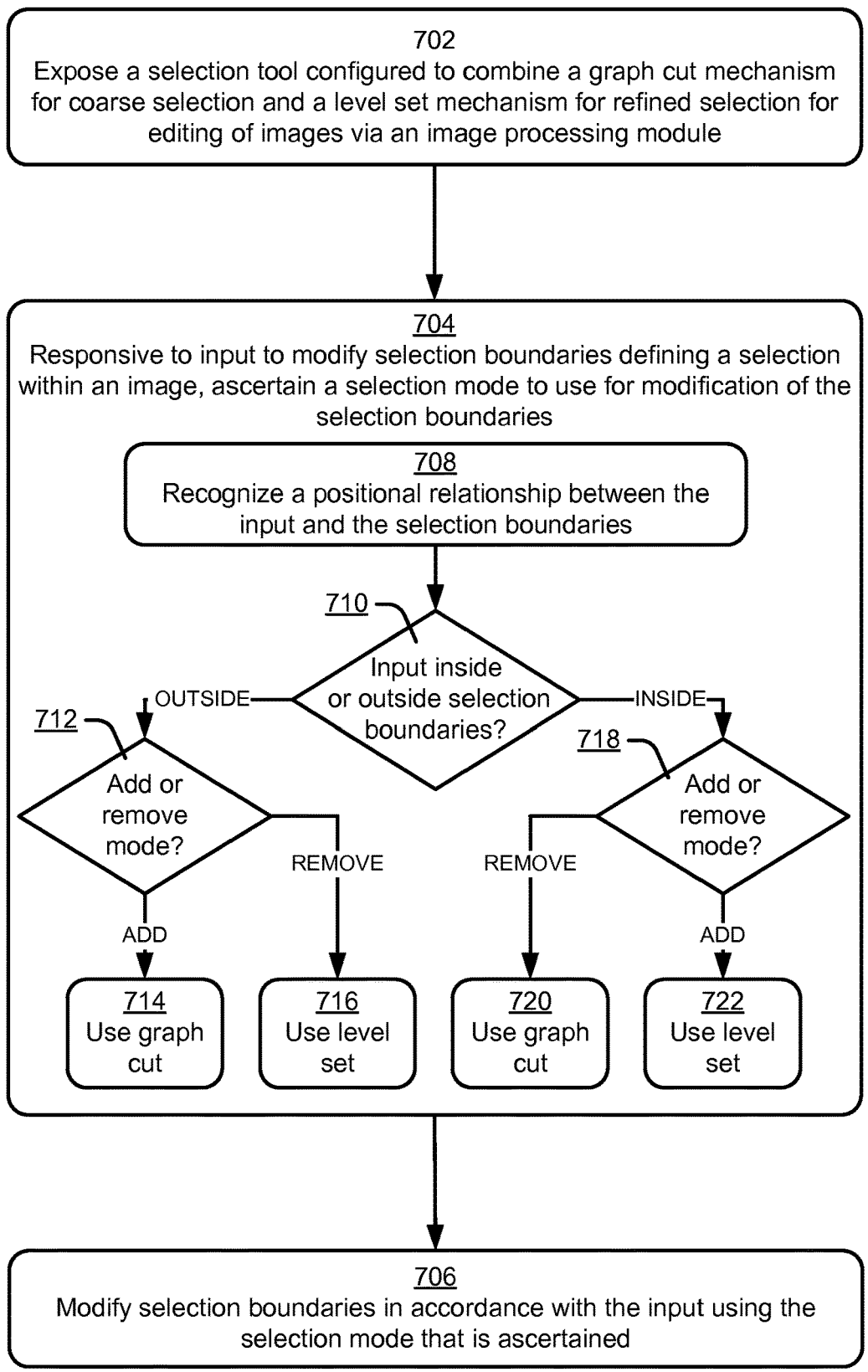
FIG. 7 is a flow diagram depicting a procedure in an example implementation in which a selection mode for a combined selection tool is ascertained.

FIG. 7 is a flow diagram depicting a procedure 700 in an example implementation in which a selection mode for a combined selection tool is ascertained. A selection tool is exposed that is configured to combine a graph cut mechanism for coarse selection and a level set mechanism for refined selection for editing of images via an image processing module (702). Responsive to input to modify selection boundaries defining a selection within an image, a selection mode is ascertained to use for modification of the selection boundaries (block 704). Selection boundaries are then modified in accordance with the input using the selection mode that is ascertained (block 706). Details regarding a selection tool, setting of a selection mode, and modification of the selection boundaries are discussed previously in this document. FIG. 7, though, represents a particular example in which graph cut mechanism for coarse selection and a level set mechanism for refined selection. Details regarding the graph cut mechanism and level set mechanism are provided under corresponding headings, just below.

FIG. 7 additionally represent details regarding setting of a selection mode based upon a positional relationship. In particular, ascertaining and switching between selection modes may be based at least in part upon recognition of a positional relationship between the input and the selection boundaries (block 708). In accordance with the positional relationship that is recognized, a determination is made regarding whether the input is applied inside or outside of the selection boundaries (block 710). When the input is outside, a determination regarding whether an add mode or remove mode is activated is made (block 712), and then a graph cut mechanism is used for coarse selection when add mode is activated (block 714) and a level set mechanism is used for refined selection when add mode is activated (block 716). On the other hand, when the input is inside, a comparable determination regarding whether an add mode or remove mode is activated is made (block 718), and then a graph cut mechanism is used for coarse selection when remove mode is activated (block 720) and a level set mechanism is used for refined selection when add mode is activated (block 722).

Thus, modification of the boundaries per block 706 may occur using the selection modes that are determined based on the positional relationship. It should be noted that modes may be switched back and forth in response to continued input, as the positional relationship and add/remove mode changes. Thus, various combinations of the selection modes to add and remove content may be used for a particular selection sequence. Graph cut and level set mechanisms are described below as illustrative examples of techniques that may be used for coarse selection and refined selection, respectively. However, other suitable mechanisms are contemplated and the inventive concepts are not intended to be limited to the enumerated examples of graph cut and level set.

Graph Cut Mechanism

Graph cut is a mechanism for dividing a graph into two using a min-cut or max-flow algorithm. In an implementation of graph cut for image object selection, a user may make touch swipes or drag a cursor over an image to draw foreground strokes or background strokes. The strokes themselves may or may not be shown on the display. If the user draws a foreground stroke, then pixels under the foreground stroke are recognized as part of the foreground. Likewise, pixels under a background stroke are recognized as part of the background. The distinction between foreground/background may be automatic and/or the user may explicitly indicate whether a stroke is considered foreground or background. The indication may occur in various ways, such as by clicking a button, holding a key on the keyboard, using a different mouse button for foreground and background, or otherwise. For pixels that are not covered by a stroke, the graph cut algorithm automatically assigns them to foreground or background. When doing so, the algorithm identifies edges of objects and attempts to position selection boundaries on the edges in the image.

A graph cut algorithm may operate to solve for a selection by minimizing an energy function in the following form:

$$E(X) = \sum_{x_i \in X} R(x_i) + \lambda \sum_{(x_i, x_j) \in N(X)} B(x_i, x_j)|x_i - x_j|$$

X is the set of pixel labels $x_i$ where $x_i=0$ indicates that the pixel i is part of the background and $x_i=1$ indicates that pixel i is part of the object. N(X) is the set of all pairs of labels corresponding to pixels that are neighboring in the image. The scalar $\lambda$ trades off the relative importance of the functions R and B. The function R is a region term that gives a cost for a given pixel i having the label $x_i$. R may be determined by the user strokes. In some formulations, the costs set by R apply to pixels under the user strokes. In such cases, if a user draws a foreground stroke over pixel i, then $R(x_i)=0$ for $x_i=1$ and $R(x_i)=\infty$ for $x_i=0$. If the user draws a background stroke over i, $R(x_i)=0$ for $x_i=0$ and $R(x_i)=\infty$ for $x_i=1$. For all pixels that are not covered by a user stroke, $R(x_i)=0$. In other implementations of graph cut segmentation, the term R will be defined using a foreground color model computed with pixels under the foreground stroke and a background color model from pixels under a background stroke. B is a function that encourages the selection boundary to follow image edges. It may be a function of the gradient in the image. For example, B may be defined as:

$$B(x_i, x_j) = e^{-\frac{(C_i - C_j)^2}{2\sigma^2}},$$

where $C_i$ is the color of pixel i.

The graph cut energy function can be minimized exactly using the min-cut or the max-flow algorithm.

Level Set Mechanism

Generally speaking, the level set mechanism operates to recognize a boundary of a region and distinguish between pixels inside and outside of the boundary. In the context of a combined selection tool discussed herein, the level set mechanism enables refined manipulation of selection boundaries that are established for image processing operations. The level set is one example approach that may be employed to implement a refinement selection mode as described herein.

In particular, suppose a real-valued function over an image $\phi(x)$, where x is location of each image pixel. A level set is a set of pixels on which $\phi(x)$ is constant. Typically, level set refers to zero level set, i.e., the set $\{x|\phi(x)=0\}$. In addition, $\phi(x)$ may be defined as a function of distance to the zero level set. In this approach, the zero level set is a curved boundary of a region. Assume that $\phi(x)$ inside the region is defined as negative and outside the region as positive. Then, $\{x|\phi(x)=10\}$ is a curve formed by pixels outside the region 10 pixels away from the boundary. On the other hand $\{x|\phi(x)=-10\}$ is a curve 10 pixels away from the boundary inside the region.

Accordingly, level set can be used to define and recognize an image region, where $\phi(x)<0$ inside the region, $\phi(x)>0$ outside the region, and the boundary equates to $\phi(x)=0$. Since level set is not simply a binary mask, but a smoothly varying field, derivatives of level set can be computed and partial differential equations (PDE) can be implemented. Therefore, level set is naturally suitable for region boundary moving (growing, shrinking and merging) smoothly over time since we can solve a PDE that has such properties. This region boundary moving may be used to make granular refinements to the boundary of a selected set of pixels as described herein.

In one example, an advection PDE in the form $d\phi/dt + vx\, d\phi/dx + vy\, d\phi/dy = 0$ is used for boundary manipulations. Here, vx and vy represent velocity in x and y directions. The terms $d\phi/dt$, $d\phi/dx$, and $d\phi/dy$ are partial derivatives of F with respect to t (e.g., time), x and y. The velocity vector is defined as v=(vx,vy). The PDE may solved in any suitable way, examples of which include but are not limited to upwinding or semi-lagrangian advection methods. The solution to the PDE provides movement of the boundary interface in the direction of velocity. The selection boundary (e.g., the zero level set) may be manipulated in any direction by selectively setting the corresponding velocity v and direction. For example, the level set selection may be configured to set v as slightly growing or shrinking along the gradient direction (e.g., for addition or removal from the selection). An edge snapping velocity may also be computed from second derivative of image intensity. In addition or alternatively, a smoothing velocity component may be added to control the amount of jaggedness of selection boundary.

Having consider example details of and procedures related to a combined selection tool, consider now a discussion of an example system having various representative components that can be utilized to implement aspects of the techniques described herein.

Example System and Device

Figure 8:
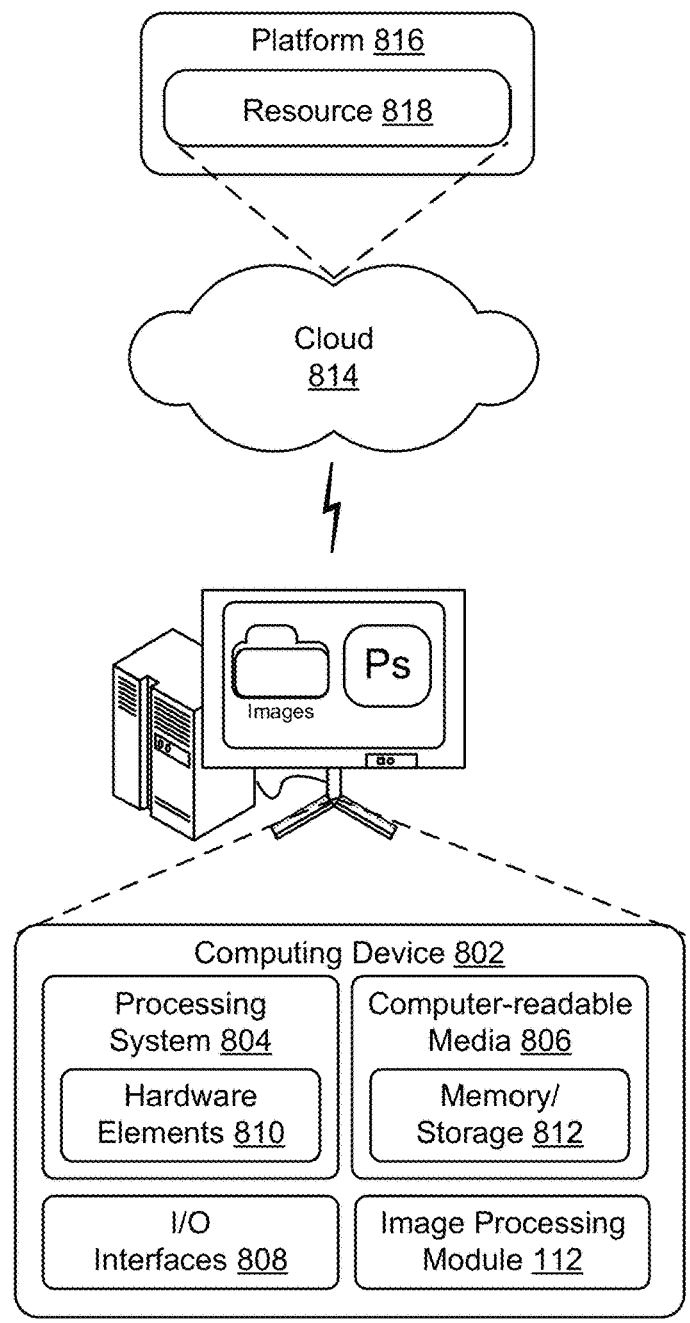
FIG. 8 illustrates an example system including various components of an example device that can be implemented as any type of computing device as described or utilized with reference to FIGS. 1 to 7 to implement aspects of the techniques described herein.

FIG. 8 illustrates an example system generally at 800 that includes an example computing device 802 that is representative of one or more computing systems and devices that may implement the various techniques described herein. This is illustrated through inclusion of the image processing module 112, which may be configured to process image data, such as image data captured by an image capture device 104. The computing device 802 may be, for example, a server of a service provider, a device associated with a client (e.g., a client device), an on-chip system, or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media including by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and functions may be executable/operable by one or more articles of manufacture (for example, one or more computing devices 802 and processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes or is representative of a platform 816 for resources 818. The platform 816 abstracts underlying functionality of hardware (e.g., servers) and software resources of the cloud 814. The resources 818 may include applications or data that can be utilized while computer processing is executed on servers that are remote from the computing device 802. Resources 818 can also include services provided over the Internet or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
    exposing an image for editing in a user interface;
    establishing a position of a selection boundary defining a selected portion of the image exposed for editing via the user interface;
    obtaining input to modify the selection boundary and recognizing a positional relationship of the input relative to the selection boundary;
    determining whether an add mode or a remove mode is active;
    setting a selection mode of a combined selection tool to toggle between a coarse selection mode and a refinement selection mode by:
        automatically triggering the coarse selection mode based on determining that the add mode is active and the input is applied outside relative to the selection boundary, or that the remove mode is active and the input is applied inside relative to the selection boundary; and
        automatically triggering the refinement selection mode based on determining that the add mode is active and the input is applied inside relative to the selection boundary, or that the remove mode is active and the input is applied outside relative to the selection boundary; and
    modifying the selection boundary in accordance with the detected input using the triggered selection mode.

2. A method as described in claim 1, wherein the user interface corresponds to an image editing application configured to provide multiple tools for editing images.

3. A method as described in claim 1, wherein automatically triggering the coarse selection mode or the refinement selection mode is further based on a direction, velocity, or a pattern associated with the input.

4. A method as described in claim 1, further comprising:
    associating the coarse selection mode and the refinement selection mode with respective gestures recognizable based on the input; and
    recognizing a gesture indicated by the input and automatically triggering the coarse selection mode of the refinement selection mode to correspond to the gesture that is recognized.

5. A method as described in claim 1, further comprising:
    detecting initiation of an image editing operation via the user interface; and
    applying the image editing operation to the one or more portions of the image within the selection boundaries as modified.

6. A method as described in claim 1, wherein the coarse selection mode is configured to implement a graph set mechanism for selection within the image.

7. A method as described in claim 1, wherein the refinement selection mode is configured to implement a level set mechanism for selection within the image.

8. A method as described in claim 1, wherein the input obtained is a touch based input.

9. A method as described in claim 1, wherein determining whether an add mode or a remove mode is active is based on a gesture associated with the input.

10. A system comprising:
    a processing system including one or more hardware elements;
    an image processing module operable via the processing system to perform operations for selection or deselection within images including:
        establishing a position of selection boundaries defining selected portions of an image exposed for editing via a user interface of the image processing module;
        detecting input, from a combined selection tool, to modify the selection boundary and recognizing a positional relationship of the input relative to the selection boundary;
        determining whether an add mode or a remove mode is active;
        setting a selection mode of the combined selection tool to toggle between a coarse selection mode and a refinement selection mode by:
            automatically triggering the coarse selection mode based on determining that the add mode is active and the input is applied outside relative to the selection boundary, or that the remove mode is active and the input is applied inside relative to the selection boundary; and automatically triggering the refinement selection mode based on determining that the add mode is active and the input is applied inside relative to the selection boundary, or that the remove mode is active and the input is applied outside relative to the selection boundary; and modifying the selection boundaries in accordance with the detected input using the triggered selection mode.

11. A system as described in claim 10, wherein the coarse selection mode is configured to implement a graph cut mechanism for selection within the image and the refinement selection mode is configured to implement a level set mechanism for selection within the image.

12. A system as described in claim 10, wherein the operations further include:

recognizing a gesture associated with the input; and setting the selection mode of the combined selection tool as one of the coarse selection mode or the refinement selection mode by matching the recognized gesture and activating the matching one of said modes as the selection mode.

13. A system as described in claim 10, wherein automatically triggering the coarse selection mode or the refinement selection mode is further based on direction, velocity, or a pattern associated with the input.

14. A system as described in claim 10, wherein determining whether an add mode or a remove mode is active is based on a gesture associated with the input.

15. One or more computer-readable storage media storing instructions that, responsive to execution by a computing device, are configured to cause the computing device to perform operations for image processing comprising:

exposing a combined selection tool configured to combine a graph cut mechanism for coarse selection and a level set mechanism for refined selection for editing of images via an image processing module;

responsive to input to modify selection boundaries defining a selection within an image, automatically toggling back and forth between selection modes of the combined selection tool to use for modification of the selection boundaries, wherein automatically toggling includes:

determining whether an add mode or a remove mode is active;

setting a selection mode of a combined selection tool as one of a graph cut mode and a level set mode by:

automatically triggering the graph cut mode based on determining that the add mode is active and the input is applied outside relative to the selection boundary, or that the remove mode is active and the input is applied inside relative to the selection boundary; and automatically triggering the level set mode based on determining that the add mode is active and the input is applied inside relative to the selection boundary, or that the remove mode is active and the input is applied outside relative to the selection boundary; and modifying the selection boundaries in accordance with the input using one or more of the selection modes corresponding to the input.

16. One or more computer-readable storage media as described in claim 15, wherein automatically toggling between selection modes comprises:

when the input is applied outside:

using the graph cut mechanism when the add mode is activated; and using the level set mechanism when the remove mode is activated; and when the input is applied inside:

using the graph cut mechanism when remove mode is activated; and using the level set mechanism when add mode is activated.

17. One or more computer-readable storage media as described in claim 15, wherein automatically toggling back and forth between selection modes of the combined selection tool is further based on direction, velocity, or a pattern associated with the input.

18. One or more computer-readable storage media as described in claim 15, wherein the determination of whether an add mode or a remove mode is active is based on a gesture associated with the input.

19. One or more computer-readable storage media as described in claim 15, further comprising:

associating the coarse selection mode with respective gestures recognizable based on the input; and recognizing a gesture indicated by the input and automatically employing the graph cut mechanism to correspond to the gesture that is recognized.

20. One or more computer-readable storage media as described in claim 15, further comprising:

associating the refinement selection mode with respective gestures recognizable based on the input; and recognizing a gesture indicated by the input and automatically employing the level set mechanism to correspond to the gesture that is recognized.

* * * * *